United States Patent
Greene

(10) Patent No.: US 9,596,503 B1
(45) Date of Patent: Mar. 14, 2017

(54) APPARATUS, SYSTEMS AND METHODS FOR DELETING RECORDING TIMERS OF A MEDIA DEVICE

(71) Applicant: EchoStar Technologies L.L.C., Englewood, CO (US)

(72) Inventor: Gregory Greene, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/886,322

(22) Filed: Oct. 19, 2015

(51) Int. Cl.
| H04N 21/4335 | (2011.01) |
| H04N 21/442  | (2011.01) |
| H04N 21/254  | (2011.01) |
| H04N 21/4627 | (2011.01) |
| H04N 21/433  | (2011.01) |
| H04N 21/45   | (2011.01) |
| H04N 21/458  | (2011.01) |
| H04N 21/2343 | (2011.01) |
| H04N 21/231  | (2011.01) |
| H04N 21/454  | (2011.01) |
| H04N 21/472  | (2011.01) |

(52) U.S. Cl.
CPC ..... *H04N 21/4335* (2013.01); *H04N 21/2343* (2013.01); *H04N 21/23113* (2013.01); *H04N 21/2541* (2013.01); *H04N 21/4334* (2013.01); *H04N 21/44231* (2013.01); *H04N 21/45* (2013.01); *H04N 21/4532* (2013.01); *H04N 21/4542* (2013.01); *H04N 21/4583* (2013.01); *H04N 21/4627* (2013.01); *H04N 21/47214* (2013.01)

(58) Field of Classification Search
USPC ............. 725/25, 29, 58, 134, 135, 139, 142; 386/292, 296, 293, 294, 295, 298, 252, 386/83; 463/37
See application file for complete search history.

(56) References Cited

U.S. PATENT DOCUMENTS

| 4,918,531 A | 4/1990 | Johnson |
| 4,979,047 A | 12/1990 | Wine |

(Continued)

FOREIGN PATENT DOCUMENTS

EP      0651570 A2      12/1995

OTHER PUBLICATIONS

"BeoVision 11." Bang & Olufsen. Dec. 2011. Web. Sep. 23, 2015. <http://content.abt.com/documents/57176/1857055_user.pdf>.

(Continued)

*Primary Examiner* — Hoang-Vu A Nguyen-Ba
(74) *Attorney, Agent, or Firm* — Lowe Graham Jones PLLC

(57) ABSTRACT

Systems and methods are operable to manage timers that control recording of media content. An exemplary embodiment compares a retrieved stale timer criteria with a retrieved timer attribute; determines whether the timer is stale based on the comparison of the retrieved timer attribute and the stale timer criteria, wherein the timer is determined to be stale when the media content event identified by the timer will not be recorded because the media content event identified by the timer is not scheduled to be broadcast at a future date; and then automatically deletes the timer in response to determining that the timer is stale.

16 Claims, 2 Drawing Sheets

| MCE IDENTFIER | CHANNEL | START DATE | START TIME | END TIME | RE-OCCUR | STALE | TITLE | MISCALLANEOUS INFORMATION |
|---|---|---|---|---|---|---|---|---|
| PROGRAM 1 | STATION A | DATE 1 | S TIME 1 | E TIME 1 | NO | NO | TITLE 1 | INFORMATION 1 |
| PROGRAM 1 | STATION B | DATE 2 | S TIME 2 | E TIME 2 | YES | NO | TITLE 2 | INFORMATION 2 |
| PROGRAM 1 | STATION C | DATE 3 | S TIME 3 | E TIME 3 | NO | YES | TITLE 3 | INFORMATION 3 |
| ... | | | | | | | | |
| PROGRAM *i* | STATION G | DATE *i* | S TIME *i* | E TIME *i* | YES | NO | TITLE *i* | INFORMATION *i* |

- USER SPECIFIED GENERIC STALE TIMER ACTIVITY DURATION — 302
- PREDEFINED STALE GENERIC TIMER ACTIVITY DURATION — 304
- USER SUBSCRIPTION INFORMATION AND/OR AUTHORIZATION — 306
- PREDEFINED MEDIA CONTENT INFORMATION — 308
- PREDEFINED MEDIA CONTENT EVENT IDENTIFIER — 310

(56) References Cited

U.S. PATENT DOCUMENTS

| | | | |
|---|---|---|---|
| 6,208,799 B1* | 3/2001 | Marsh | H04N 5/44543 |
| | | | 348/E5.007 |
| 6,259,486 B1 | 7/2001 | Mahvi | |
| 6,681,396 B1 | 1/2004 | Bates et al. | |
| 7,167,418 B2 | 1/2007 | Hallberg | |
| 7,800,701 B2 | 9/2010 | Chen et al. | |
| 8,745,666 B1* | 6/2014 | Zaveri | H04N 21/2407 |
| | | | 725/14 |
| 8,798,444 B1* | 8/2014 | Crandall | H04N 21/4334 |
| | | | 386/292 |
| 9,087,065 B2 | 7/2015 | Christenson et al. | |
| 2003/0190150 A1* | 10/2003 | Kawasaki | H04N 5/76 |
| | | | 386/243 |
| 2005/0055715 A1* | 3/2005 | Minnick | H04N 5/44543 |
| | | | 725/58 |
| 2006/0215900 A1* | 9/2006 | Oaki | G06K 9/03 |
| | | | 382/145 |
| 2012/0224834 A1 | 9/2012 | Chen et al. | |
| 2013/0243403 A1 | 9/2013 | Martch | |
| 2014/0270715 A1 | 9/2014 | Minnick et al. | |
| 2015/0189367 A1 | 7/2015 | Schindler et al. | |

OTHER PUBLICATIONS

"Using the System Using Timers." Dec. 2011 Web. Sep. 23, 2015 <http://support.bell.ca_web/guides/TV/UserGuide/Receiver/5200/timers_8(en).pdf>.

* cited by examiner

| MCE IDENTIFIER | CHANNEL | START DATE | START TIME | END TIME | RE-OCCUR | STALE | TITLE | MISCALLANEOUS INFORMATION |
|---|---|---|---|---|---|---|---|---|
| PROGRAM 1 | STATION A | DATE 1 | S TIME 1 | E TIME 1 | NO | NO | TITLE 1 | INFORMATION 1 |
| PROGRAM 1 | STATION B | DATE 2 | S TIME 2 | E TIME 2 | YES | NO | TITLE 2 | INFORMATION 2 |
| PROGRAM 1 | STATION C | DATE 3 | S TIME 3 | E TIME 3 | NO | YES | TITLE 3 | INFORMATION 3 |
| PROGRAM i | STATION G | DATE i | S TIME i | E TIME i | YES | NO | TITLE i | INFORMATION i |

FIG. 2

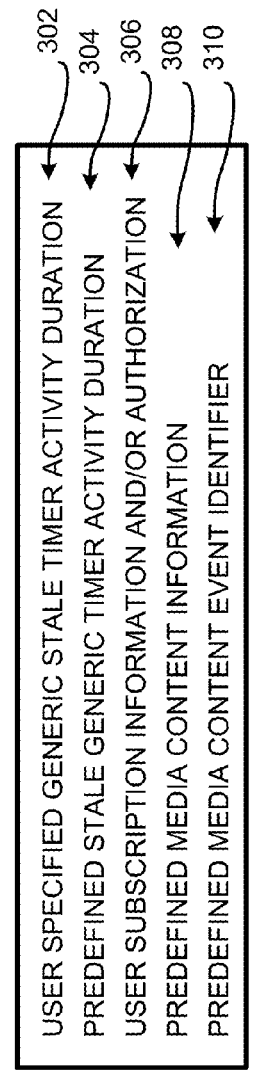

- USER SPECIFIED GENERIC STALE TIMER ACTIVITY DURATION
- PREDEFINED STALE GENERIC TIMER ACTIVITY DURATION
- USER SUBSCRIPTION INFORMATION AND/OR AUTHORIZATION
- PREDEFINED MEDIA CONTENT INFORMATION
- PREDEFINED MEDIA CONTENT EVENT IDENTIFIER

FIG. 3

APPARATUS, SYSTEMS AND METHODS FOR DELETING RECORDING TIMERS OF A MEDIA DEVICE

BACKGROUND

Media devices, such as a set top box, a stereo, a television, a computer system, a game system, or the like, are configured to present a media content event to a user. The video portion of the media content event is presented to a user on a display and the audio portion of the media content is reproduced as audible sounds by one or more speakers. In a broadcast operating environment, a media content provider broadcasts one or more streams of media content (interchangeably referred to herein as a media content stream) to the media devices.

Typically, a media content event presents theme-based visual and audio content to a user for their enjoyment and/or for informative purposes. Examples of such theme-based content includes movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically. Advertisements, commercials or the like may be interspersed within the media content event.

In a broadcast environment, the media content event is broadcast to a plurality of media devices in a stream of media content residing in the media content stream. Typically, at any given instant in time, the media device may be receiving one or more media content streams with hundreds of, or even thousands of, concurrently broadcast streaming media content events. Typically, presentation of a media content event occurs over some time span (duration). Thus, the media content event has a beginning portion that usually presents identifying information about the media content event, such as music, text of a title, or other information. When the user views this beginning portion of the media content event, the user intuitively understands that they are viewing the beginning of the media content event.

If the user is viewing a live broadcast of a particular media content event of interest, the media content event of interest is presented as it is being received by the media device. Accordingly, as a stream of media content with the media content event of interest is being initially broadcast, presentation of the media content event of interest to the user can begin at the actual broadcast start time of the media content event of interest. As time progresses, the entirety of the streaming media content event of interest is presented to the user as the stream of media content is being broadcast to and is received at the media device. At some point, the media content event of interest comes to its end (conclusion).

On occasion, the user may be interested in viewing a particular media content event that is scheduled for broadcasting at a future time. A schedule of media content events and their associated broadcast schedule is presented to the user in the form of an electronic program guide (EPG). The user typically is able to navigate to and highlight (focus) onto a region of the presented EPG that is indicating the particular media content event of interest that the user is interested in viewing and/or recording. For convenience, the user may specify, via the presented EPG, a particular media content event of interest that should be recorded (saved into a memory medium), such as a digital video recorder residing in the media device.

In response to receiving the user specification for a recording of a particular media content event, the media device accesses EPG information that includes the scheduled broadcast start time, the scheduled broadcast end time, and the channel that is providing the broadcast of the specified media content event of interest. The scheduled broadcast start time is used to define a recording start time (these times are typically the same time, though some amount of time may be optionally added to advance the recording start time ahead of the scheduled broadcast start time by some predefined duration). Similarly, the scheduled broadcast end time is used to define a recording end time (these times are typically the same time, though some amount of time may be optionally subtracted to delay the recording end time behind of the scheduled broadcast end time by some predefined duration). The media content event identifier, recording start time, the recording end time, the channel identifier, and/or other recording instructions (interchangeably referred to herein as a "timer") is then stored by the media device.

The timer may specify recording information for a single media content event. In other instances, the timer may specify that the media device is to perform a plurality of recordings for a series of related media content events. For example, the user may enjoy a comedy series, wherein a new episode of the comedy is broadcast each week at a particular time and on a particular channel during its episode season. The timers may indicate that the media device is to record new broadcast episodes of the comedy series.

As time progresses, the media device compares real time with the start times of each of the stored timers. When real time approaches the broadcast start time of a particular timer, the media device "tunes" itself to the channel that is broadcasting the specified media content event. The channel information of the timer is used to tune the media device to receive the media content stream having the specified media content event of interest.

Then, at the specified start time, the media device initiates recording of the media content event. That is, the recording begins when real time reaches the scheduled broadcast time. The recording ends at the specified end time (corresponding to the broadcast end time).

For each requested recording, a timer is generated. Accordingly, over a relatively long period of time, the user may request recordings of many different media content events (or series of related media content events). Thus, many different timers may be stored by the media device. At some point in time, a timer is likely to become stale and no longer be valid. That is, at some point in time, a stored timer will never be used again to record a media content event. Such timers are interchangeably referred to herein as a "stale timer."

For example, if the timer is configured to record a plurality of serial media content events (such as the example comedy series that weekly broadcasts a new episode during its season), at some point it is likely that the series will end. After the series finale has been broadcast, there will never be new broadcast media content events for that particular series. Thus, that timer will become stale (and never be used again). Similarly, a sporting event between two particular teams will occur only one time. After the sporting event is broadcast, the timer generated for the recording of the sporting event will never be used again, and thus will become a stale timer.

The accumulation of a large number of timers, and particularly a large number of stale times, at the media device creates several issues. A first issue is that storing a large number of timers at the media device requires a relatively large amount of memory storage capacity. Here, any stale timers stored in the memory unnecessarily utilize memory capacity of the media device.

A second issue arises in that some media devices must constantly compare real time with the recording start times of each of the stored timers. Here, computational resources of the media device are needlessly used if the start times of stale timers are continually reviewed since the stale timers will never be used to generate an actual recording at the media device.

A third issue arises when many timers have been stored and generated at the media device. The user of the media device is typically responsible for management of their user-defined timers. The media device is typically configured to present the user a listing, menu, or the like of their user-defined timers. If a large number of timers have been defined by the user, then the process of reviewing their timers may be relatively cumbersome for the user (in that some amount of time will be required for the user to review and ascertain the recording information of each listed timer, and then make a decision to delete or retain each particular timer).

Further, if a timer is no longer desirable, or if a timer is stale, the user may be required to manually instruct the media device to delete or otherwise erase that particular timer. If many stale timers are listed, the user amount of time required for the user to identify, consider, and then to manually delete stale timers may be perceived by the user as a waste of their personal time.

Accordingly, there is a need in the arts to better manage timers that have been stored at a media device.

SUMMARY

Systems and methods of managing timers that control recording of media content are disclosed. An exemplary embodiment compares a retrieved stale timer criteria with a retrieved timer attribute; determines whether the timer is stale based on the comparison of the retrieved timer attribute and the stale timer criteria, wherein the timer is determined to be stale when the media content event identified by the timer will not be recorded because the media content event identified by the timer is not scheduled to be broadcast at a future date; and then automatically deletes the timer in response to determining that the timer is stale.

BRIEF DESCRIPTION OF THE DRAWINGS

Preferred and alternative embodiments are described in detail below with reference to the following drawings:

FIG. 2 conceptually illustrates information associated with a plurality of active timers that are stored in the timer data portion of a memory of the media device; and FIG. 3 conceptually illustrates information associated with stale timer criteria that is stored in the memory of the media device.

DETAILED DESCRIPTION

Figure 1:
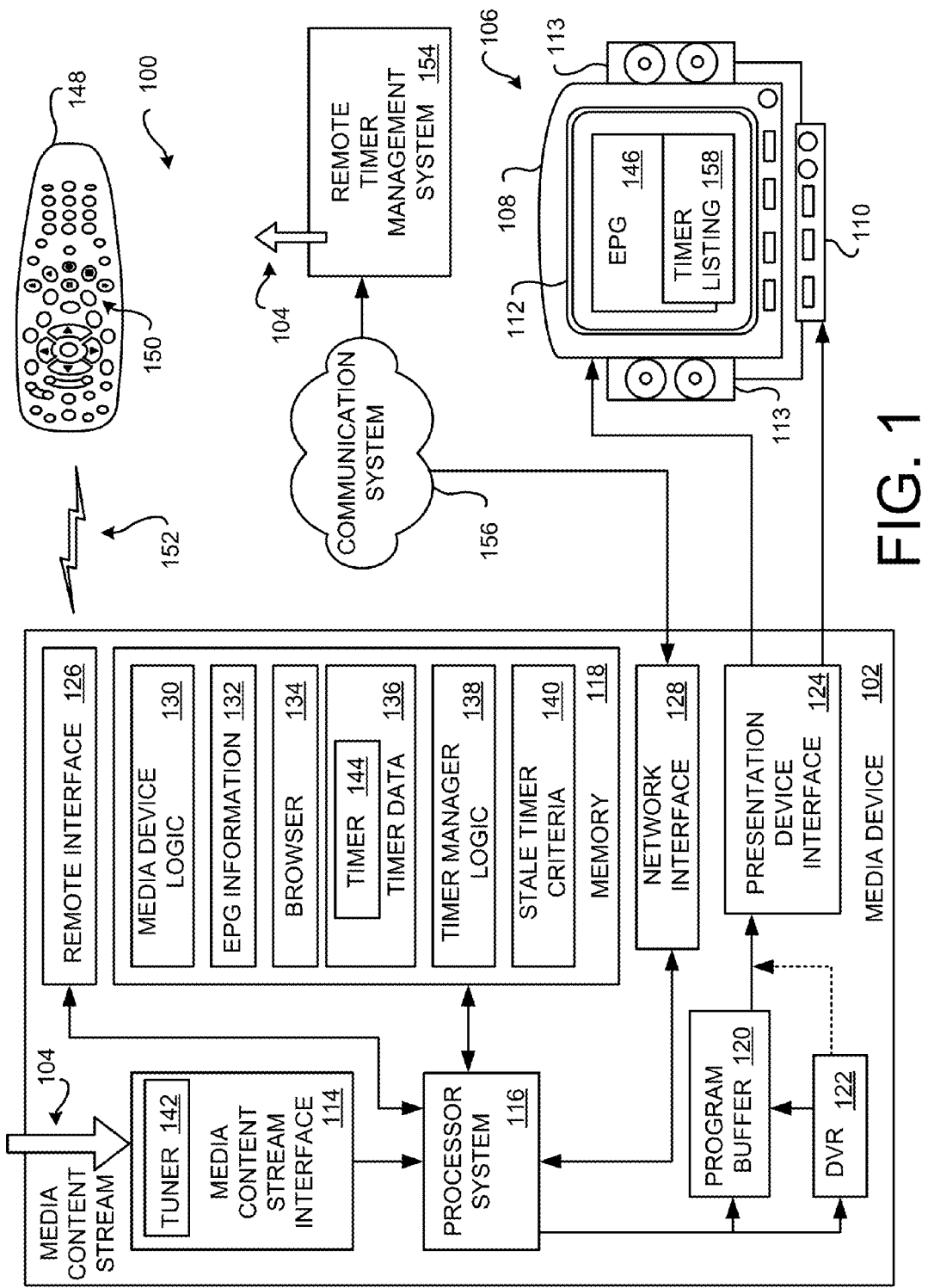
FIG. 1 is a block diagram of an embodiment of a stale timer management system implemented in a media device.

FIG. 1 is a block diagram of an embodiment of a stale timer management system 100 implemented in a media device 102, such as, but not limited to, a set top box (STB). Embodiments of the stale timer management system 100 may be implemented in other media devices, such as, but not limited to, a stereo, a surround-sound receiver, a radio, a television (TV), a digital video disc (DVD) player, a digital video recorder (DVR), a game playing device, or a personal computer (PC) that is configured to receive a media content stream 104 having one or more media content events therein.

Embodiments of the stale timer management system 100 are configured to selectively delete, erase or otherwise discard stale timers. Accordingly, processing power of the media device 102 is conserved (since recording information associated with deleted stale timers are no longer monitored and compared with real time), memory capacity at the media device 102 is conserved (since selected stale timers are automatically deleted), and user interaction for timer management is streamlined (since the user does not have to manage stale timers that have been automatically deleted).

In the various embodiments, when an active timer initially becomes stale, the stale timer is not immediately deleted. Rather, some attribute of a stale timer is compared with one or more stale timer criteria. If and when a stale timer attribute corresponds to (matches with) at least one stale timer criteria, then that particular stale timer is selectively deleted, erased or otherwise discarded from the media device 102. The deleted, erased or otherwise discarded is referred to herein as a deleted stale timer.

The exemplary media device 102 is communicatively coupled to a media presentation system 106 that includes a visual presentation device 108, such as a television (hereafter, generically a TV), and an audio presentation device 110, such as a surround sound receiver controlling an audio reproduction device. The video portion of the media content event is presented to a user on a display 112 of the visual presentation device 108. The audio portion of the media content is reproduced as audible sounds by one or more speakers 113 of the audio presentation device 110. Other types of output devices may also be coupled to the media device 102, including those providing any sort of stimuli sensible by a human being, such as temperature, vibration and the like. In some embodiments, the media device 102 and one or more of the components of the media presentation system 106 may be integrated into a single electronic device.

The non-limiting exemplary media device 102 comprises a media content stream interface 114, a processor system 116, a memory 118, a program buffer 120, an optional digital video recorder (DVR) 122, a presentation device interface 124, a remote interface 126, and an optional network interface 128. The memory 118 comprises portions for storing the media device logic 130, the electronic program guide (EPG) information 132, an optional browser 134, timer data 136, timer manager logic 138, and stale timer criteria 140. In some embodiments, the media device logic 130 and the timer manager logic 138 may be integrated together, and/or may be integrated with other logic. Alternatively, or additionally, the EPG information 132, the timer data 136, and/or the stale timer criteria 140 may be stored together and/or may be stored in any other suitable memory medium In other embodiments, some or all of these memory and other data manipulation functions may be provided using a remote server or other electronic devices suitably connected via the Internet or otherwise to a client device. Other media devices 102 may include some, or may omit some, of the above-described components. Further, additional components not described herein may be included in alternative embodiments.

The functionality of the media device 102, here illustrated as a generic set top box, is now broadly described. In a satellite broadcast system, a media content provider provides media content that is received in one or more multiple media content streams 104 multiplexed together in one or more transport channels. The transport channels with the media content streams 104 are communicated to the media device 102 from a media system sourced from a remote head end facility (not shown) operated by the media content provider. The media device 102 is configured to receive one or more broadcasted satellite signals detected by an antenna (not shown). Non-limiting examples of other media systems that broadcast a media content stream 104 include a cable system, a radio frequency (RF) communication system, and the Internet.

The one or more media content streams 104 are received by the media content stream interface 114. In a broadcast environment, one or more tuners 142 in the media content stream interface 114 selectively tune to one of the media content streams 104 in accordance with instructions received from the processor system 116. The processor system 116, executing the media device logic 130 and based upon a request for a media content event of interest specified by a user, parses out media content associated with the media content event of interest. The media content event of interest is then assembled into a stream of video and/or audio information which may be temporarily stored (buffered) by the program buffer 120 such that the media content can be streamed out to components of the media presentation system 106, such as the visual display device 108 and/or the audio presentation device 110, via the presentation device interface 124.

Alternatively, or additionally, the parsed out media content event may be saved into the DVR 122 for later presentation. The DVR 122 may be directly provided in, locally connected to, or remotely connected to, the media device 102. The recording of a received media content event is controlled by the media device logic 130 in accordance with an associated timer 144 that has been stored in the timer data 136. The timer 144 is predefined by the media device 102 based on a recording request made by a user of the media device 102. The timer 144 includes a media content event identifier, recording start time, the recording end time, the channel identifier, and/or other recording instructions of the media content event that is to be recorded.

From time to time, information populating the EPG information 132 of the memory 118 is communicated to the media device 102, via the media content stream 104 or via another suitable media. The EPG information 132 stores the information pertaining to the scheduled programming of media content events. The EPG information 132 may include, but is not limited to, an identifier, a scheduled presentation start and/or end time, a program channel, and descriptive information for each media content event. The media content event's descriptive information may include the title of the media content event, names of performers or actors, date of creation, and a summary describing the nature of the media content event. Any suitable information may be included in the supplemental information. Upon receipt of a command from the user requesting presentation of an EPG display, the information in the EPG information 132 is retrieved, formatted, and then presented on the display 112 as an EPG 146.

The exemplary media device 102 is configured to receive commands from a user via a remote control 148. The remote control 148 includes one or more controllers 150 disposed on the surface of the remote control 148. The user, by actuating one or more of the controllers 150, causes the remote control 148 to generate and transmit commands, via a wireless signal 152, to the media device 102. The commands control the media device 102 and/or control the various components of the media presentation system 106. The wireless signal 152 may be an infrared (IR) signal or a radio frequency (RF) signal that is detectable by the remote interface 126.

The processes performed by the media device 102 relating to the processing of the received media content stream 104 and communication of a presentable media content event to the components of the media presentation system 106 are generally implemented by the processor system 116 while executing the media device logic 130. Thus, the media device 102 may perform a variety of functions related to the processing and presentation of one or more media content events received in the media content stream 104.

Some embodiments of the media device 102 may be configured to communicatively couple to a remote timer management system 154 to which the network interface 128 is coupled, via a communication system 156. The communication system 156 is illustrated as a generic communication system. In one embodiment, the communication system 156 comprises a cellular telephone system, such as a radio frequency (RF) wireless system. Accordingly, the media device 102 includes a suitable transceiver. Alternatively, the communication system 156 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 102 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 102 may be configured to communicate over combination systems having a plurality of segments which employ different formats for each segment that employ different technologies on each segment FIG. 2 conceptually illustrates non-limiting example information associated with a plurality of timers 144 that are stored in the timer data 136 of memory 118 (FIG. 1). In some embodiments, the recording information (interchangeably referred to herein as "timer information") stored in the timer data 136 is stored using a suitable database or the like. Any suitable data storing format may be used by the various embodiments. In some embodiments, the timer information is integrated with the EPG broadcasting information stored in the EPG information 132.

The exemplary timer information of any particular timer 144 includes various information (interchangeably referred to herein as timer attributes) that is used to identify a media content event that is to be recorded into the DVR 122 when that particular identified media content event is broadcast to and is received at the media device 102. In some embodiments, the timers 144 may include less information, additional information, and/or alternative information, than the exemplary timer information (timer attributes) shown in FIG. 2.

Each timer 144 includes at least one unique media content event (MCE) identifier, conceptually indicated in the "MCE Identifier" column 202 (see for example "Program i") that is used to identify a media content event that is to be recorded from other media content events. Any suitable identifier may be used to identify a media content event that is scheduled for presentation.

Channel information, conceptually indicated in the channel information column 204 (see "Station i" for the Program i, for example), identifies the "channel" that the media content event will be received on in the media content stream 104. The channel information may be used for a variety of purposes. For example, the media device 102 may be receiving many different media content streams 104, each broadcast at a particular different frequency (or frequency range). The tuner 142 would use the channel information to "tune" to the correct media content stream 104 having the associated media content event that is to be recorded. Alternatively, or additionally, the channel information may indicate the media content source (interchangeably referred to herein as a "station") that originated the media content event. Alternatively, or additionally, the channel information may include other identifying information, such as a packet identifier (PID) of the like that is used to identify data packets that are transporting the media content event to the media device. In some operating applications, several different media content events may be interleaved together into a single media content stream 104. The PID information or the like is then used to parse out the media content event that is being recorded from the other media content events received in the same media content stream 104.

Each timer 144 includes a start date, conceptually indicated in the start date column 206 (see "S date i" for the Program i, for example). Each timer 144 also includes a start time, conceptually indicated in the start time column 208 (see "S time i" for the Program i, for example). The start date identifies the date (month, day, year, or the like) and the start time identifies the time of day that the media content event is to be recorded. The start date and start time correspond to the date and time that the media content event is scheduled to be broadcast to the media device 102. In some embodiments, the start time may be offset in advance of the broadcast start time by some relatively small predefined duration.

The media device 102 has an internal clock component (not shown), or has access to real time information, that provide the current real time and date. In an example embodiment, the real time and date is compared with the start time and start date information in the various timers 144 stored in the timer data 136. As the current real time and date approaches the scheduled broadcast date and time of one of the timers 144, the media device 102 initiates the process of recording that particular associated media content event. In other embodiments, the real time and date may be compared to the scheduled broadcast time and date.

At some short duration prior to the start time (an/or scheduled broadcast time), the media device 102 operates or configures one to its tuners 142 to receive the media content event from its designated media content stream 104. As noted above, the tuner 142 then becomes configured (operational) to receive the designated media content stream 104 based on the channel information. Then, the processor system 116 is able to receive and process the incoming media content stream 104. When the broadcast of the media content event occurs (as specified in the start date 206 and the start time 208, and/or as specified by the scheduled broadcast start time and date that is indicated in the EPG information 132), the DVR 122 begins to record the media content event.

Each timer 144 includes an end time, conceptually indicated in the end time column 210 (see the "E time i" for the Program i, for example). The end time corresponds to the scheduled broadcast end time of the media content event. During the recording of the media content event, the end time (and optionally the end date) are compared with real time. When the end time is reached, the recording process ends. In some embodiments, the start time may be offset to occur after the broadcast end time by some relatively small predefined duration.

Timers 144 may include a flag or other indicator (conceptually indicated in the "Reoccur" column 212) that indicates whether a media content event is one of a series of related media content events (such as the above-described weekly comedy series). For example, the first media content event ("Program 1") indicates that that particular media content event is not a reoccurring type of media content event that should be repeatedly recorded when different serial episodes are broadcast (here indicated by the "No" entry, though any suitable flag or indicia may be used). In contrast, the second media content event ("Program 2") is indicated as being a reoccurring type media content event (here indicated by the "Yes" entry, though any suitable flag or indicia may be used). Here, the media device 102 is configured to record a next instance of the reoccurring media content event when it is broadcast in the future. In an example embodiment, the start date of the timer 144 is advanced to the upcoming scheduled broadcast date of the next scheduled episode. (Some embodiments of the media device 102 may be configured to record only new episodes, and therefore conserve memory resources of the DVR 122.)

In some embodiments, the timers 144 may include optional information that indicates whether the timer 144 of the associated media content event has become stale or if the timer 144 is an active timer. A flag or other indicator (conceptually indicated in the "Stale" column 214) is used that indicates whether a media content event is active or stale. Here, an active timer is a timer 144 that will result in a recording of a broadcasted media content event since the information of the active timer corresponds to a media content event that is scheduled for broadcast to the media device 102 (assuming that that particular media content event is actually broadcast as scheduled, and is therefore not delayed, preempted, or otherwise cancelled).

In contrast, a stale timer will never result in a recording (or at least have a very low probability that a recording will be made) since the media content event associated with the stale timer is not scheduled for broadcast. For example, a media content event associated with the stale timer may have already been broadcast. As another non-limiting example, the media content event associated with the stale time may be the last of a series of media content events. Or, the media content event associated with the stale timer may have been delayed, preempted, or otherwise cancelled.

If the timer 144 of the associated media content event is not stale (here indicated by the "No" entry, though any suitable flag or indicia may be used), then the media device 102 continually monitors the scheduled start date and start time for that particular timer 144 with the current real time and date in anticipation that that particular media content event is to be recorded when it is being broadcast in one of the media content streams 104. If the timer 144 of the associated media content event is stale (here indicated by the "Yes" entry, though any suitable flag or indicia may be used), then one skilled in the art appreciates that no future broadcast of that particular media content event will occur, and therefore, that no recording will ever be initiated based on that particular timer 144. In some embodiments, the media device 102 continually monitors the scheduled start date and start time of the stale timers with the current real time and date even though that particular media content event will never be recorded (thus needlessly utilizing computation resources of the media device 102 until embodiments of the stale timer management system 100 delete the stale timer).

In some embodiments, the timer 144 may optionally include the title, conceptually indicated in the Title column 216 (see "Title i" for the Program i, for example) of the media content event for that particular timer 144. When the timer listing 158 (FIG. 1) is presented to the user to facilitate the user's management of their user-specified timers 144, the title may be retrieved and presented to the user so that the user intuitively appreciates which particular media content event is being recorded by that particular timer 144.

Miscellaneous information, conceptually indicated in the Miscellaneous Information column 218 (see "Information i" for the Program i, for example) of a timer 144 may include other information that may be of interest to a user when a timer listing 158 is generated and displayed. In an example embodiment, the miscellaneous information identifies whether the associated media content event is provided on a premium subscription basis, and the identity of the providing the premium service. Typically, the user of a particular media device 102 must pay a premium service charge and obtain authorization information before the associated media content vent can be viewed and/or recorded. Any suitable information may be used by the various embodiments.

In the various embodiments, a particular stale timer may be deleted from the timer data 136 in a variety of manners. In an example embodiment, the user may manually delete any previously generated timer 144. Here, the user may personally know that a particular timer 144 is or will become stale, such as when a series has ended (or is ending) and is no longer being produced.

In one exemplary embodiment, media content events scheduled for recording are indicated on a presented EPG 146 with a suitable icon, lettering, and/or shading. The indicators intuitively inform a viewing user that that particular media content event shown on the EPG 146 is scheduled for recording. A timer 144 has been previously generated based on a received user request to record that particular media content event, and/or broadcasting episodes of a serial media content event that is periodically broadcast. The user may manually navigate to the portion of the EPG 146 associated with a media content event scheduled for recording, and then actuate one or more of the controllers 150 on their remote control 148 to manually cause the associated timer 144 to be deleted from the timer data 136. The presented EPG 146 may then be modified to indicate that the recording has been manually canceled by the user.

Alternatively, or additionally, a presented timer listing 158 indicates previously generated timers 144 to the viewing user. The timer listing 158 may be configured to permit the user to select a particular timer 144 for deletion. For example, if the user appreciates that a timer 144 associated with a particular series of media content events has become stale, the user may manually delete that particular stale timer 144 via the presented timer listing 158. In an example embodiment, the timer listing 158 may provide a graphical icon (such as a square, circle or the like) that the user may navigate to and then select by actuation one or more of the controllers 150 on their remote control 148. Alternatively, the user may navigate to a particular region of the presented timer listing 158 to highlight a particular timer 144. A subsequent actuation of one or more of the controllers 150 will then delete that highlighted timer 144.

FIG. 3 conceptually illustrates information associated with stale timer criteria 300 that is stored in the stale timer criteria 140 of memory 118 (FIG. 1). The non-limiting exemplary stale timer criteria 300 include: a user specified generic stale timer activity duration 302, a predefined stale generic timer activity duration 304, user subscription information and/or authorization 306, predefined media content information 308, and/or a predefined media content event identifier 310. Depending on the embodiment, some of the various stale timer criteria may be combined, may be omitted, and/or other stale timer criteria may be added.

In the various embodiments of the stale timer management system 100, information (timer attributes) pertaining to the timers 144 stored in the timer listing 158 are compared to a corresponding stale timer criteria 300. If one or more timer attributes of a particular timer 144 matches with (is the same, or corresponds to) a corresponding stale timer criteria 300, than that particular timer 144 is determined to be a stale timer. The stale timer may then be automatically deleted from the timer listing 158 by the stale timer management system 100.

The stale timer management system 100 may perform the comparison of the timer information with the stale timer criteria 140 at various times. In an example embodiment, the comparison is performed periodically based on a predefined duration. The user may define the duration. Alternatively, or additionally, the duration may be predefined by the media content provider or another interested entity. The duration may be stored in the memory 118 or another suitable memory medium, and then accessed accordingly by the timer manager logic 138. For example, but not limited to, the duration may be a week, a month or a year such that the comparison is performed weekly, monthly, or annually. Any suitable duration may be used in the various embodiments.

Alternatively, or additionally, the comparison may be performed when the user initially uses the media device 102 for presentation of a media content event and/or to schedule a media content event for recording. Alternatively, or additionally, the comparison may be performed at a predefined specific date and/or time. Alternatively, or additionally, the comparison may be performed in response to some other event, such as a user account change and/or a change in subscriber services of the user.

The first example stale timer criteria 300 is the user specified generic stale timer activity duration 302. Here, the user specifies a duration, such as one month, one year, or the like. Any suitable duration may be specified. For any particular timer 144, if no recording activity has occurred at the media device 102 over that preceding user specified duration, then that particular timer 144 is determined to be a stale timer. Then, that determined stale timer is automatically deleted by the stale timer management system 100. Here, the user-specified duration of inactivity is generically applicable to any stored timer 144 (and hence, the duration is named as the "user specified generic stale timer activity duration 302").

The second example stale timer criteria 300 is the predefined stale generic timer activity duration 304. Here, the media content provider or another interested entity specifies a duration, such as one month, one year, or the like. Any suitable duration may be specified. For any particular timer 144, if no recording activity occurs at the media device over that predefined duration, then that particular timer 144 is determined to be a stale timer. Then, that determined stale timer is automatically deleted by the stale timer management system 100. Here, the predefined duration of inactivity is generically applicable to any stored timer 144 (and hence, the duration is named as the "predefined stale generic timer activity duration 304").

In an example embodiment, when the criteria 302 and/or 304 are used as a basis of comparison to determine if a timer 144 is stale and should be automatically deleted, a difference is determined between the start date and start time of a timer 144 and the current real date and time. If the determined difference is greater than or equal to (that is, at least equal to) the user specified duration or the predefined duration, then the timer 144 is defined as a stale timer and is then automatically deleted by the stale timer management system 100. That is, if the actual duration of inactivity is greater than or equal to the user defined or predefined duration, the timer 144 is deleted. It is appreciated that under this scenario, some timer 144 may actually be stale timers, but are not yet automatically deleted by the stale timer management system 100 since the duration of inactivity is not yet greater than or equal to the user defined or predefined duration attribute of the timer 144.

Some serial type media content events are characterized by a plurality of episodes that are broadcast over a particular duration (referred to interchangeably herein as a "season"). Once the season ends with broadcast of the last one of the series of media content events, there is typically a break, or relatively long duration in time, before the start of the next new season. Some embodiments are configured to automatically modify a timer 144 that is configured to record serial type media content events. Here, after a currently broadcasting media content event of the series is broadcast, the start date of the timer 144 is updated to the next scheduled broadcast date of the next episode in the series. This update information may be communicated to the media device in any suitable manners, such as in the meta data of the media content event and/or in EPG information updates. When the last episode of a series (referred to as the "season finale") is broadcast, the date of broadcast of the first episode of the next series is preferably used to update that timer 144. If the season finale is also the very last episode of a concluding series (referred to as the "series finale"), then there will be no update of the start date or that timer 144. At some point in time, the current date will exceed the start date of the timer 144 by the user defined or predefined duration, and the timer 144 will be automatically deleted by the stale timer management system 100.

If the media content event is a onetime event, such as a sporting event, movie, or the like, then the start date of the timer 144 is not automatically updated. At some point in time, the current date will exceed the start date of the timer 144 by the user defined or predefined duration, and that particular timer 144 will be automatically deleted by the stale timer management system 100.

The third example stale timer criteria 300 is the user subscription information and/or authorization 306. Here, an example timer attribute of a media content event that is scheduled for recording is whether or not the media content event is a premium-type media content event. If the media content event is a premium-type media content event, the user must be an authorized subscriber for that particular media content event at the time of broadcast and recording. That is, the stale timer criteria is a user authorization to record the media content event that is valid when current date and reaches the start date and start time of the timer. The timer attribute is whether the media content event is a premium-type media content event, and therefore requires the valid user authorization, or if the media content event is a non-premium-type media content event that does not require the valid user authorization.

Some premium-type media content events are provided on a for-pay basis. Here, the user must make payment arrangements for that particular premium-type media content event. Alternatively, or additionally, a premium-type media content event may be provided by a subscription-based premium media content provider (via a particular channel of media content and/or via a particular media content stream 104). Here, the user must be a paying subscriber that has a current valid authorization to record the particular media content event of interest at the time of recording.

The authorization of a user to receive and/or record a premium-type media content event may be stored in the miscellaneous information of a timer 144 (or in another suitable location in the timer 144). If the user is authorized, the media device 102 records the broadcasting premium-type media content event. Otherwise, the media device 102 cannot record the broadcasting premium-type media content event.

In some situations, information identifying the media content event as being a premium-type media content event is stored in the timer information. At the time of recording, the stale timer management system 100 may be configured to verify authorization of the user. If the user is authorized, the media device 102 records the broadcasting premium-type media content event.

Situations may arise wherein a user was an authorized subscriber at the time that the timer 144 was generated for recording of a particular premium-type media content event. However, at the time of broadcast of the premium-type media content event, the user may no longer be a subscriber for that particular subscription-based premium-type media content provider, and/or the pay for view rights for the premium-type media content event may have expired. For example, the user may have set a series or repeating timers to record new episodes of a popular program "Spiders" that is airing weekly over the next three months on a premium type subscription-based channel. However, at some point, the user may have terminated their subscription for service from that particular subscription-based media content provider, and is therefore no longer authorized to receive and record any later broadcast "Spider" episodes. However, the previously defined timer 144 for that particular media content event will still be stored in the timer data 136. Here, embodiments of the stale timer management system 100 access the information of the timer data 136, or access information in the EPG information 132, or access other information, which indicates whether the media content event associated with a particular timer requires user authorization prior to, or at the time of, recording. If user authorization is required, and the user is properly authorized to record the media content event, then the stale timer management system 100 determines that timer 144 is an active timer (such that the media content event is recorded during its broadcast that is received at the media device 102). However, if the user is not properly authorized, then the stale timer management system 100 determines that the timer 144 for that particular media content event is a stale timer. The stale timer may then be automatically deleted by the stale timer management system 100 from the timer data 136.

In an example embodiment, the remote timer management system 154 may communicate an instruction to the media device 102 to automatically delete any timers 144 associated with premium-type media content events and/or any timer that are associated with media content events provide by a premium-type media content provider. In response to receiving such an instruction at the media device 102, the stale timer management system 100 accesses all stored timers 144, defines any found timers 144 associated with the premium-type media content events as being a stale timer, and then deletes those stale timers.

The fourth example stale timer criteria 300 is the predefined media content information 308. Here, at some point, a particular media content event (or series of media content events) may become known to be not scheduled for broadcast. For example, the media content provider, the originating entity that created or produces the media content event (or series of media content events), may know that that particular media content event (or series of media content events) will never again be broadcast (or at least broadcast in the foreseeable future), such as when the particular media content event (or series of media content events) are canceled. This information may then be communicated to the media device 102. The media device 102 then checks the stored timers 144 to determine if a particular timer 144 has been generated and stored for that particular media content event (or series of media content events). If a timer 144 is found for that particular media content event (or series of media content events), that that timer may be defined as a stale timer and may then be automatically deleted by the stale timer management system 100. In a non-limiting exemplary embodiment, the flag or other indicator in the "Stale" column 214 that indicates whether a media content event may be set to a stale state. Then, when the stale timer management system 100 compares the stale timer criteria with the timers 144, the identified stale timer may be automatically deleted by the stale timer management system 100. Alternatively, the stale timer may be automatically deleted in response to receiving information that the timer 144 is now stale.

The information that a particular timer 144 has become stale may be communicated to the media device 102 in a variety of manners. For example, but not limited to, the information may be communicated from the remote timer management system 154 to the media device 102 via the communication system 156. Alternatively, or additionally, the information may be included in a media content stream 104, such as in the metadata of a broadcasting media content event, or as separately communicated information. Here, many receiving media devices 102 will receive the information. Alternatively, or additionally, the information may be included in an EPG information update so that many receiving media devices 102 will receive the information. Any suitable manner of communicating the information that a media content event (or series of media content events) has become stale to the media device 102 may be used by the various embodiments.

The information that a media content event (or series of media content events) has become stale may be communicated to the media device 102 at times selected by the remote timer management system 154 (here, referred to as "pushing" the information to the media device 102). Alternatively, or additionally, the media device 102 may communicate a request to receive the information to the remote timer management system 154 (here, referred to as "pulling" the information), via the communication system 156.

The fifth example stale timer criteria 300 is the predefined media content event identifier 310. Here, the identifier information associated with a media content event (or series of media content events) is used by the stale timer management system 100 to determine whether the timer 144 has become stale, and accordingly, should be automatically deleted by the stale timer management system 100. In an example situation, the remote timer management system 154 may communicate an instruction that any timers 144 corresponding to a particular media content event (or series of media content events) has become stale to the media device 102 are to be deleted. The instruction may optionally specify that the timers 144 should be automatically deleted on a specific date (and optionally, a specific time). For example, a particular service provider may change availability of a particular sporting event to a premium-type media content event. The instruction may cause all previously generated and stored timers 144 for that particular premium-type media content event to be deleted (unless the user of that media device is authorized to receive and record that particular media content event).

In some embodiments, deleted stale timers (or information corresponding thereto) are copied and are then communicated from the media device 102 to the remote timer management system 154. The remote timer management system 154 maintains a database of deleted timers 144 and their associated media devices 102. In a non-limiting application, at some point in the future, the associated media content event (or series of media content events) may become scheduled to be broadcast to the media devices 102. The timers 144 associated with that particular media content event (or series of media content events) may then be communicated back to those media devices 102 that had previously deleted those timers 144. The media devices 102 may re-save the timers 144 such that when the media content event (or series of media content events) is broadcast, the media device 102 records the broadcasting media content event (or series of media content events). In some embodiments, the timer listing 158 or other suitable user interface is presented to the user wherein the user is then able to confirm that the returned timers 144 are to be re-saved by their media device 102.

In another non-limiting application, a user may have unsubscribed to a premium-type channel or to a premium-type media content event. At that time, the associated timers 144 would be have been automatically deleted by the stale timer management system 100. However, at a later time, the user may have re-subscribed to the premium-type channel and/or to the premium-type media content event(s). The timers 144 associated with that particular premium-type channel and/or to the premium-type media content event(s) may then be communicated back to the media device 102. The media devices 102 may re-save the timers 144 such that when the premium-type media content event (or series of media content events) is broadcast, the media device 102 records the broadcasting premium-type media content event (or series of media content events). In some embodiments, the timer listing 158 or other suitable user interface is presented to the user wherein the user is then able to confirm that the returned timers 144 are to be re-saved by their media device 102.

In some embodiments, deleted stale timers may be saved into the memory 118 or may be retained as information in the timer data 136 (and identified as being stale). In the event that the stale timers are reactivated as described herein, the detailed information of the stale timers is readily available at the media device 102. Thus, the amount of information stored at the remote timer management system 154, and/or the amount of timer information that is returned by the remote timer management system 154 to the media devices 102, may be reduced. For example, subscription information for a user of a particular media device 102 may be communicated to the media device 102, and the stale timer management system 100 residing in the media device 102 can reactivate any associated stale timers that have not yet been automatically deleted by the stale timer management system 100 based on another criteria.

It should be emphasized that the above-described embodiments of the stale timer management system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media device configured to record a broadcasted media content event at the time of its broadcast, comprising:
   a tuner configured to tune to and receive a broadcast media content stream having the media content event that is to be recorded;
   a memory that stores a plurality of timers, wherein each timer is defined by a plurality of timer attributes that include at least an identifier of the media content event that is to be recorded, a start time that initiates a recording of the media content event when a current real time reaches the start time, and an end time that concludes the recording of the media content event when the current real time reaches the end time,
   a recording medium operable to receive and store the media content event during the broadcast of the media content event that is to be recorded; and
   a processor system, wherein the processor system is configured to:
      monitor a current date and the current time such that the recording is initiated when the media content event is broadcast;
      retrieve a timer attribute associated with a selected one of the plurality of timers stored in the memory of the media device;
      retrieve a stale timer criteria stored in the memory of the media device,
         wherein the stale timer criteria defines a characteristic of one of the plurality of timer attributes, and
         wherein the stale timer criteria corresponds to the retrieved timer attribute;
      compare the retrieved stale timer criteria with the retrieved timer attribute;
      determine whether the timer is stale based on the comparison of the retrieved timer attribute and the stale timer criteria, wherein the timer is determined to be stale when the media content event identified by the timer will not be recorded because the media content event identified by the timer is not scheduled to be broadcast at a future date; and
      automatically delete the timer from the memory of the media device in response to determining that the timer is stale,
   wherein the retrieved timer attribute is a start date, wherein the start date specifies a date that the media device initiates the recording of the media content event when the current date reaches the start date and the start time of the timer,
   wherein the stale timer criteria is a predefined duration that is stored at the media device,
   wherein when the processor system determines whether the retrieved timer is stale based on the comparison of the retrieved timer attribute and the stale timer criteria, the processor system is further configured to:
      determine a duration difference between the start date and the current date; and
      compare the determined duration difference with the predefined duration, and
   wherein the retrieved timer is determined to be stale when the determined duration difference is at least equal to the predefined duration.

2. The media device of claim 1, wherein the processor system is further configured to:
   receive a specification of the predefined duration from a user of the media device; and
   store the predefined duration in the memory of the media device in response to receiving the specification of the predefined duration.

3. The media device of claim 1, wherein the processor system is further configured to:
   receive a specification of the predefined duration from a remote timer management system that is communicatively coupled to the media device via the Internet; and
   storing the predefined duration in the memory of the media device in response to receiving the specification of the predefined duration.

4. A media device configured to record a broadcasted media content event at the time of its broadcast, comprising:
   a tuner configured to tune to and receive a broadcast media content stream having the media content event that is to be recorded;
   a memory that stores a plurality of timers, wherein each timer is defined by a plurality of timer attributes that include at least an identifier of the media content event that is to be recorded, a start time that initiates a recording of the media content event when a current real time reaches the start time, and an end time that concludes the recording of the media content event when the current real time reaches the end time,
   a recording medium operable to receive and store the media content event during the broadcast of the media content event that is to be recorded; and
   a processor system, wherein the processor system is configured to:
      monitor a current date and a current time such that the recording is initiated when the media content event is broadcast;
      retrieve a timer attribute associated with a selected one of the plurality of timers stored in the memory of the media device;
      retrieve a stale timer criteria stored in the memory of the media device,
         wherein the stale timer criteria defines a characteristic of one of the plurality of timer attributes, and
         wherein the stale timer criteria corresponds to the retrieved timer attribute;
      compare the retrieved stale timer criteria with the retrieved timer attribute;
      determine whether the timer is stale based on the comparison of the retrieved timer attribute and the stale timer criteria, wherein the timer is determined to be stale when the media content event identified by the timer will not be recorded because the media content event identified by the timer is not scheduled to be broadcast at a future date; and
      automatically delete the timer from the memory of the media device in response to determining that the timer is stale,
   wherein the retrieved timer attribute is whether the media content event identified by the timer is a premium-type media content event that requires a valid user authorization or is a non-premium-type media content event that does not require the valid user authorization, wherein the stale timer criteria is a user authorization to record the media content event that is valid when the current date reaches the start date and the start time of the timer, and wherein when the processor system determines whether the timer is stale based on the comparison of the retrieved timer attribute and the stale timer criteria, the processor system is further configured to:

determine if the user has the valid user authorization when the current date reaches the start date and the start time of the timer;

wherein the timer is determined to be stale when the user authorization is not valid.

5. A media device configured to record a broadcasted media content event at the time of its broadcast, comprising:

a tuner configured to tune to and receive a broadcast media content stream having the media content event that is to be recorded;

a memory that stores a plurality of timers, wherein each timer is defined by a plurality of timer attributes that include at least an identifier of the media content event that is to be recorded, a start time that initiates a recording of the media content event when a current real time reaches the start time, and an end time that concludes the recording of the media content event when the current real time reaches the end time, a recording medium operable to receive and store the media content event during the broadcast of the media content event that is to be recorded; and a processor system, wherein the processor system is configured to:

monitor a current date and a current time such that the recording is initiated when the media content event is broadcast, retrieve a timer attribute associated with a selected one of the plurality of timers stored in the memory of the media device;

retrieve a stale timer criteria stored in the memory of the media device, wherein the stale timer criteria defines a characteristic of one of the plurality of timer attributes, and wherein the stale timer criteria corresponds to the retrieved timer attribute;

compare the retrieved stale timer criteria with the retrieved timer attribute;

determine whether the timer is stale based on the comparison of the retrieved timer attribute and the stale timer criteria, wherein the timer is determined to be stale when the media content event identified by the timer will not be recorded because the media content event identified by the timer is not scheduled to be broadcast at a future date; and automatically delete the timer from the memory of the media device in response to determining that the timer is stale, wherein the retrieved timer attribute is the identifier of the media content event identified by the timer, wherein the stale timer criteria is information that identifies at least one media content event that is not scheduled for a future broadcast, and wherein when the processor system determines whether the timer is stale based on the comparison of the retrieved timer attribute and the stale timer criteria, the processor system is further configured to:

compare the identifier of the media content event identified by the timer and the information that identifies at least one media content event that is not scheduled for the future broadcast;

wherein the timer is determined to be stale when the identifier of the media content event identified by the timer and the information that identifies the at least one media content event that is not scheduled for the future broadcast are the same.

6. A method of managing timers that control recording of media content events by a media device, the method comprising:

retrieving a timer attribute associated with a timer, wherein the timer is one of a plurality of timers stored at the media device, wherein each timer is defined by a plurality of timer attributes, wherein the plurality of timer attributes include at least an identifier of a media content event that is to be recorded, a start time that initiates a recording of the media content event when a current real time reaches the start time, and an end time that concludes the recording of the media content event when the current real time reaches the end time;

retrieving a stale timer criteria stored at the media device, wherein the stale timer criteria defines a characteristic of one of the plurality of timer attributes, and wherein the stale timer criteria corresponds to the retrieved timer attribute, comparing the retrieved stale timer criteria with the retrieved timer attribute;

determining whether the timer is stale based on the comparison of the retrieved timer attribute and the stale timer criteria, wherein the timer is determined to be stale when the media content event identified by the timer will not be recorded because the media content event identified by the timer is not scheduled to be broadcast at a future date; and automatically deleting the timer in response to determining that the timer is stale, wherein the retrieved timer attribute resides in information of the timer stored in a memory of the media device, wherein retrieving the timer attribute comprises:

retrieving the timer information stored in the timer, wherein the retrieved timer attribute is included in the retrieved timer information wherein comparing the retrieved stale timer criteria with the retrieved timer attribute comprises:

comparing the retrieved stale timer criteria with the information of the retrieved timer attribute, wherein the information of the stale timer criteria and the timer attribute comprises at least one selected from a group consisting of:

a duration defined by a user and a start date that indicates a day that the media content event is scheduled to be broadcast;

a predefined duration communicated to the media device from a remote timer management system that is communicatively coupled to the media device via the Internet and the start date that indicates a day that the media content event is scheduled to be broadcast;

a specified name of one of a plurality of media content events communicated to the media device from the remote timer management system that is communicatively coupled to the media device via the Internet and a name of the media content event associated with the timer; and subscription information communicated to the media device from the remote timer management system that is communicatively coupled to the media device via the Internet and information about the media content event pertaining to whether a subscription is required for the recording of the media content event.

7. The method of claim 6, wherein the plurality of timers were stored into the memory of the media device prior to retrieving the timer, and wherein deleting the timer comprises:
deleting the timer from the memory of the media device.

8. The method of claim 6,
wherein the plurality of timers were previously stored into the memory of the media device prior to retrieving the timer,
wherein retrieving the timer attribute, retrieving the stale timer criteria, comparing the retrieved stale timer criteria with the retrieved timer attribute, and determining whether the timer is stale is performed on a periodic basis defined by the predefined duration stored at the media device, and
wherein the predefined duration has been previously specified by the user of the media device or has been previously received from a remote timer management system that is communicatively coupled to the media device via a communication system.

9. A method of managing timers that control recording of media content events by a media device, the method comprising:
retrieving a timer attribute associated with a timer,
wherein the timer is one of a plurality of timers stored at the media device,
wherein each timer is defined by a plurality of timer attributes,
wherein the plurality of timer attributes include at least an identifier of a media content event that is to be recorded, a start time that initiates a recording of the media content event when a current real time reaches the start time, and an end time that concludes the recording of the media content event when the current real time reaches the end time;
retrieving a stale timer criteria stored at the media device,
wherein the stale timer criteria defines a characteristic of one of the plurality of timer attributes, and
wherein the stale timer criteria corresponds to the retrieved timer attribute;
comparing the retrieved stale timer criteria with the retrieved timer attribute;
determining whether the timer is stale based on the comparison of the retrieved timer attribute and the stale timer criteria, wherein the timer is determined to be stale when the media content event identified by the timer will not be recorded because the media content event identified by the timer is not scheduled to be broadcast at a future date; and
automatically deleting the timer in response to determining that the timer is stale,
wherein the retrieved timer attribute is a start date,
wherein the start date specifies a date that the media device initiates the recording of the media content event when the current date reaches the start date and the start time of the timer,
wherein the stale timer criteria is a predefined duration that is stored at the media device, and wherein determining whether the retrieved timer is stale based on the comparison of the retrieved timer attribute and the stale timer criteria comprises:
determining a duration difference between the start date and the current date; and
comparing the determined duration with the predefined duration,
wherein the retrieved timer is determined to be stale when the determined duration difference is at least equal to the predefined duration.

10. The method of claim 9, further comprising:
receiving a specification of the predefined duration from a user of the media device; and
storing the predefined duration in a memory of the media device in response to receiving the specification of the predefined duration.

11. The method of claim 9, further comprising:
receiving a specification of the predefined duration in a media content stream that is received by the media device, wherein the media content event that is to be recorded by the timer is also receivable in the media content stream; and
storing the predefined duration in the memory of the media device in response to receiving the specification of the predefined duration.

12. The method of claim 9, further comprising:
receiving a specification of the predefined duration from a remote timer management system that is communicatively coupled to the media device via the Internet; and
storing the predefined duration in a memory of the media device in response to receiving the specification of the predefined duration.

13. The method of claim 9, wherein the plurality of timers were stored into a memory of the media device prior to retrieving the timer, and wherein deleting the timer comprises:
deleting the timer from the memory of the media device.

14. A method of managing timers that control recording of media content events by a media device, the method comprising:
retrieving a timer attribute associated with a timer,
wherein the timer is one of a plurality of timers stored at the media device,
wherein each timer is defined by a plurality of timer attributes,
wherein the plurality of timer attributes include at least an identifier of a media content event that is to be recorded, a start time that initiates a recording of the media content event when a current real time reaches the start time, and an end time that concludes the recording of the media content event when the current real time reaches the end time,
retrieving a stale timer criteria stored at the media device,
wherein the stale timer criteria defines a characteristic of one of the plurality of timer attributes, and
wherein the stale timer criteria corresponds to the retrieved timer attribute,
comparing the retrieved stale timer criteria with the retrieved timer attribute;
determining whether the timer is stale based on the comparison of the retrieved timer attribute and the stale timer criteria, wherein the timer is determined to be stale when the media content event identified by the timer will not be recorded because the media content event identified by the timer is not scheduled to be broadcast at a future date; and automatically deleting the timer in response to determining that the timer is stale, wherein the retrieved timer attribute is whether the media content event identified by the timer is a premium-type media content event that requires a valid user authorization or is a non-premium-type media content event that does not require the valid user authorization, wherein the stale timer criteria is a user authorization to record the media content event that is valid when the current date reaches the start date and start time of the timer, and wherein determining whether the timer is stale based on the comparison of the retrieved timer attribute and the stale timer criteria comprises:

determining if a user has the valid user authorization when the current date reaches the start date and the start time of the timer;

wherein the timer is determined to be stale when the user authorization is not valid.

15. The method of claim 14, where in response to determining that the timer is stale, the method further comprising:

communicating the timer to a remote timer management system that is communicatively coupled to the media device via the Internet, wherein the timer is associated with the media device and is stored at the remote timer management system;

receiving the timer from the remote timer management system when the user authorization becomes valid; and storing the received timer at the media device.

16. The method of claim 14, wherein the plurality of timers were stored into a memory of the media device prior to retrieving the timer, and wherein deleting the timer comprises:

deleting the timer from the memory of the media device.

* * * * *